UNITED STATES PATENT OFFICE.

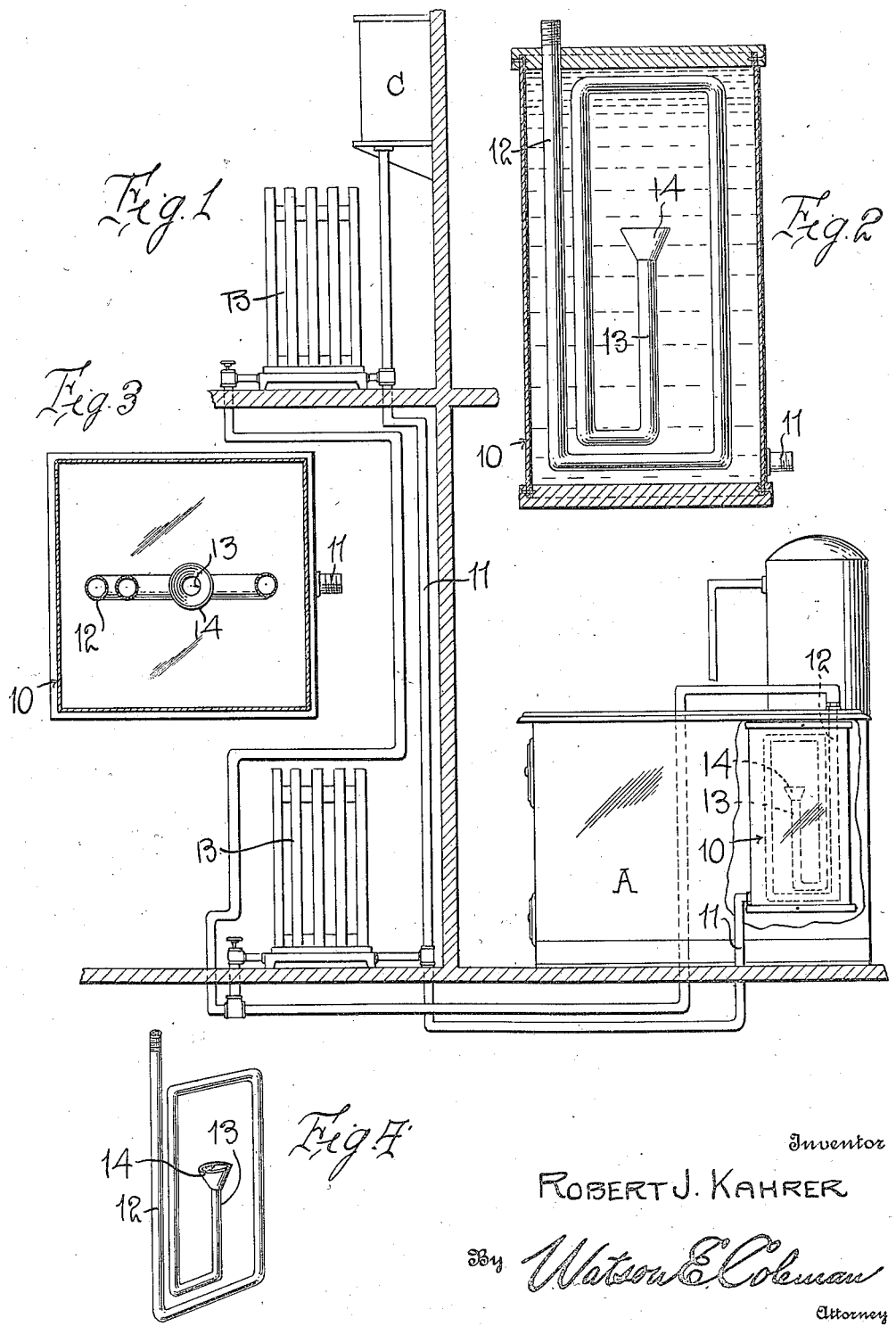

ROBERT J. KAHRER, OF NEWARK, NEW JERSEY.

WATER-HEATER.

1,222,105.  Specification of Letters Patent.  Patented Apr. 10, 1917.

Application filed February 19, 1916. Serial No. 79,384.

*To all whom it may concern:*

Be it known that I, ROBERT J. KAHRER, a citizen of the United States, residing at Newark, in the county of Essex and State of New Jersey, have invented certain new and useful Improvements in Water-Heaters, of which the following is a specification, reference being had to the accompanying drawings.

This invention relates to heaters, and particularly to devices for heating water for household purposes.

The general object of my invention is to provide a very simple form of water heater adapted to be disposed in a stove, furnace or other like heating appliance and including a tank or casing into which the water to be heated is allowed to flow, and an outlet pipe connected to the tank or casing and so arranged that it takes water from the middle of the tank or casing, carries this water in a circuitous course, and then conducts the water to any place or places where it is to be used.

My invention is illustrated in the accompanying drawings, wherein:

Figure 1 shows my water heater applied in use;

Fig. 2 is a vertical sectional view of the heater;

Fig. 3 is a horizontal sectional view; and

Fig. 4 is a perspective view of the eduction coil.

Referring to these figures, 10 designates a sheet iron casing which may be made of any suitable size and is preferably rectangular in form and which may in practical use be two feet in height and one and one-half feet square. Entering this casing 10 is a water induction pipe 11. This induction pipe 11 is disposed preferably adjacent one end of the casing, and entering the other end of the casing is an eduction pipe 12 which extends into the casing nearly to the lower end thereof, then extends at right angles, then extends upward, then transversely toward the first portion of the pipe, then again downward to a point in close proximity to the transversely disposed portion, then transversely toward the upwardly disposed portion of the pipe and then upward, as at 13, and terminates in a bell-shaped inlet mouth 14 which is disposed substantially at the center of the casing, where therefore the water is hottest.

This casing 10 is intended to be disposed within a stove, furnace or other like heating appliance A, as for instance, in the position of a water back. The casing or tank is supposed to be placed where it will receive the greatest amount of heat and is filled with water at all times.

In practical operation the water enters through the pipe 11 into the tank or casing and is heated therein. The water is drawn off from the center of the casing and circulates around the casing a number of times and then passes outward and through other rooms of the house. Inasmuch as there is a constant pressure of water in the pipe 11 it is obvious that when the water is drawn off from the house piping connected to the pipe 12 fresh cold water will flow into the casing.

My device provides a particularly economical manner of heating water for household purposes and does not necessitate any changes in the heating appliances as this tank or casing may be readily mounted in any ordinary furnace or stove. I do not wish to be limited to any details of construction shown, nor to any particular manner of placing this tank or casing within a heating appliance.

I have illustrated in Fig. 1 my invention as applied to heating water for a plurality of hot water radiators designated B, the water circulating through these radiators and returning to the heater by way of the pipe 11 which is connected to a source of supply, as for instance the tank C. It is obvious, however, that other arrangements might be made for causing a circulation of water through the radiators and heater, and that for heating purposes, as for instance supplying heated water for household purposes, the pipe 12 would have suitable valve connections.

Having described my invention, what I claim is:

As a new article of manufacture, a water heating tank provided adjacent its lower end with an induction opening, and an eduction pipe entering the tank through the top thereof and extending in close proximity to the lower end of the tank, said pipe being then extended at right angles then directed upwardly, then disposed transversely toward the first portion of the pipe, said pipe being then extended downwardly and continuing in a transversely disposed portion extending toward the upwardly directed portion of the pipe, said pipe being then disposed vertically and terminating substantially at the center of the tank and having its end open, said open end being flared, the portions of the pipe within the tank occupying the same vertical plane.

In testimony whereof I hereunto affix my signature in the presence of two witnesses.

ROBERT J. KAHRER.

Witnesses:
HERMAN SCHWEICKHARDT,
FRANK W. MOEHLER.